Feb. 28, 1956 K. BAUMLER ET AL 2,736,142
PROCESS FOR MANUFACTURING CELLULATED MATERIAL
Filed June 3, 1953 6 Sheets-Sheet 2

INVENTOR.
WALTER D. FORD and
KARL BAUMLER
BY
Oscar L. Spencer
ATTORNEY

Feb. 28, 1956 K. BAUMLER ET AL 2,736,142
PROCESS FOR MANUFACTURING CELLULATED MATERIAL
Filed June 3, 1953 6 Sheets-Sheet 4

INVENTOR.
WALTER D. FORD and
KARL BAUMLER
BY
Oscar L. Spencer
ATTORNEY

Feb. 28, 1956 K. BAUMLER ET AL 2,736,142
PROCESS FOR MANUFACTURING CELLULATED MATERIAL
Filed June 3, 1953 6 Sheets-Sheet 6

INVENTOR.
WALTER D. FORD and
KARL BAUMLER
BY
Oscar L. Spencer
ATTORNEY

# United States Patent Office 2,736,142
Patented Feb. 28, 1956

2,736,142
PROCESS FOR MANUFACTURING CELLULATED MATERIAL

Karl Baumler, Sedalia, Mo., and Walter D. Ford, Port Allegany, Pa., assignors to Pittsburgh Corning Corporation Application June 3, 1953, Serial No. 359,271

8 Claims. (Cl. 49—77)

The present invention relates to the manufacture of cellular vitreous products and it has particular relation to the manufacture of cellular vitreous products such as cellular glass and cellular silica from suitable pulverulent batch materials.

It is well known to produce a cellular material suitable for use as a heat insulator and for similar purposes by finely crushing glass cullet containing sulphates and/or certain metal oxides such as antimony oxide, mixing the ground glass with a finely divided carbonaceous cellulating agent such as carbon black, powdered coal or other carbonaceous material and then heating the mixture to a temperature sufficient to sinter and cellulate the glass. Such processes are set forth in U. S. Patents Nos. 2,123,536, 2,337,672, 2,514,324 and 2,544,954.

The sintering temperature is the temperature at which the glass particles become soft and adhere together by contact. The cellulation of the glass results from a chemical reaction which takes place at the temperature approximating or slightly above the temperature of the sintering of the glass between the cellulating agent and the sulphates and/or metal oxides in the glass. Gases such as sulphur dioxide, carbon dioxide and other gases are generated in situ in the sintered mass and are entrapped as bubbles which impart to the mass a cellular structure and result in a product of light weight and high resistance to the transmission of heat. The cell structures are in most cases sealed so that liquids or gases cannot permeate the mass.

Cellular silica is produced by heating a pulverulent mass of silica such as quartz sand, and a carbonaceous cellulating agent to a temperature sufficient to sinter and cellulate the mass. The reaction involved in this instance is between carbon and silicon dioxide to produce silicon monoxide and carbon oxide gases to generate the cellulating power. The temperature of sintering and cellulating silica is much higher than that required for sintering and cellulating glass as described above.

One of the problems involved in the production of a cellular vitreous material from a suitable pulverulent batch is concerned with the uneven sintering and cellulating of the mass to produce a nonuniformly cellulated product containing folds, voids, and other manifestations of irregular cellulation. Uniformity of cell size is highly desirable in order to obtain maximum insulating efficiency.

During the initial part of the heating of the pulverulent batch, the individual particles soften and adhere together at their place of contact. This is known as the sintering operation. However, they do not form one continuous sintered mass but rather sinter and contract into a number of irregular pieces. The greater the irregularity of these pieces formed during sintering, the less uniform is the cellulating.

Cellulation within each piece of sintered batch material is usually a progressive action. This is so since the carbonaceous materials selected preferably do not chemically react to any appreciable degree with the vitreous material to form gases until after sintering takes place. Thus this chemical action takes place at a temperature higher than is necessary to sinter the vitreous material. This is advantageous, because the higher temperatures further soften the vitreous material so that the evolving gases entrapped therein can more readily expand the material to the desired degree. It is desirable therefore to maintain the vitreous material at sintering temperature until it attains a substantially uniform temperature throughout. This procedure is set forth in U. S. Patent No. 2,544,954, granted to Walter D. Ford.

During the period in which the vitreous material is raised from sintering to cellulating temperatures, some time lag inevitably occurs between the increase in temperature at the margins and at the interior of each piece of sintered material. Hence cellulation usually begins at the margins of each piece before taking place at the center of the piece. If this time lag is too large, the cell structure at the margins tends to be larger than the cell structure within the body of the piece. Also if the pieces of sintered material are widely spaced, unrestricted cellulation at the margins of a piece usually results in overlarge or broken cell structure which contributes to formation of voids and folds.

In accordance with the present invention it is proposed to control the sintering and cellulation of a pulverulent batch by initially forming the pulverulent mass into a number of small segments. This may be accomplished by scoring, dicing or separating the powdered batch or by other suitable methods to give the batch a segmented appearance. The batch may be formed into a plurality of uniform segments to obtain uniform cellulation or into sizes conforming to a definite pattern in order to achieve a pattern of cellulation. The immediate benefits resulting from such segmentation of the batch are relatively uniform and more rapid heat penetration of the powdered mass plus substantially uniform size and spacing of the pieces of the sintered mass.

Having effected substantial control of the sintering, a correspondingly automatic control of the cellulation of the sintered pieces is made possible. Due to substantial uniformity in size of the sintered pieces of batch material, relative uniformity of heating of the pieces is more readily obtained. Each piece being relatively small in size, it will heat to cellulating temperature more rapidly and uniformly and therefore will tend to reach cellulation temperature substantially uniformly throughout the piece. This promotes uniformity of cell size within each piece and in relation to each other piece.

An established procedure in the manufacture of cellular glass requires careful preparation and mixing of the raw batch ingredients which are then placed in suitable molds for successive heating to preselected sintering and cellulating temperatures. The cellulated body is then removed from the mold, annealed and prepared for its intended uses. The invention will be further described in conjunction with such commercial process of producing cellular glass and with reference to the drawings in which Fig. 1 shows in plan view the bottom half of a mold charged with raw batch material diced in accordance with the invention;

The prepared raw batch, which usually comprises pulverulent glass and a gas forming carbonaceous cellulating agent, is weighed and discharged into the bottom half of a mold. The raw batch contains considerable air at this stage and the mold is preferably vibrated to level and settle the batch and expel a portion of the entrapped air. The pulverulent raw batch fills about one-sixth of the cubic contents of the assembled mold. The several particles of the batch adhere fairly tenaciously to each other so that the mold may be tilted to an angle of about 60° to the horizontal without appreciable movement of the mass within the mold.

Figures 2, 3:
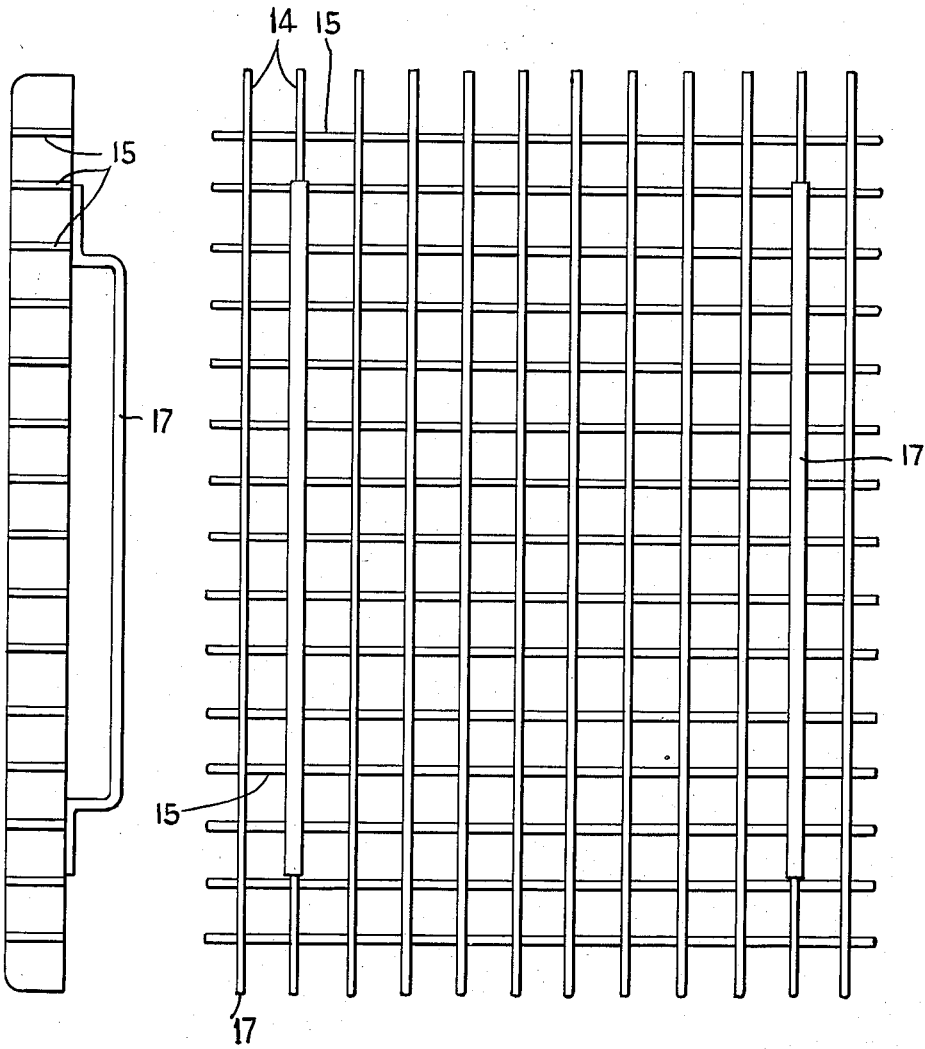
Fig. 2 illustrates one form of a suitable means for dicing the raw batch.
Fig. 3 shows a side elevation of the dicing means of Fig. 2.

According to the present invention, a suitable dicing device such as shown in Figs. 2 and 3 is then placed on the mass of raw batch and pressed thereinto, preferably until contact is made with the mold bottom.

The detailed construction of the dicing device comprises longitudinal bars 14 and transverse bars 15, each having suitable slots formed therein to permit assembly. The bars 14 and 15 may be secured in assembled relation by any suitable means such as welding. Suitable handling means, such as 17, may be attached to either of the bars 14 and 15 by any desirable means, such as welding, or other fastening means. The bars 14 and 15 are of sufficient depth so as to extend entirely through the depth of the raw batch placed in the mold bottom 19.

Figure 1:
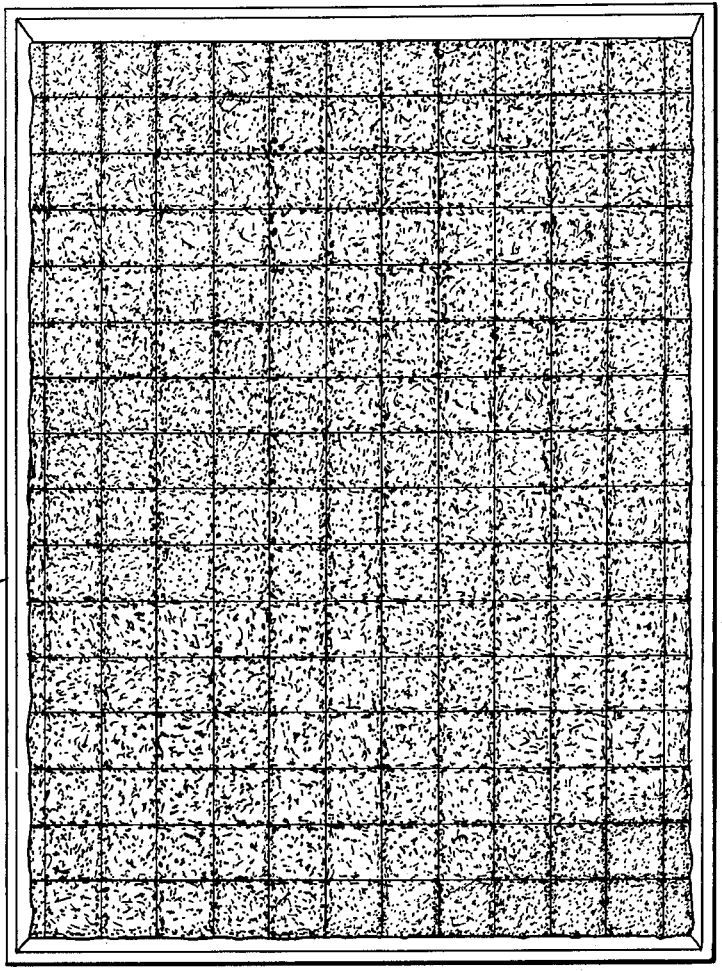

The dicing device is then withdrawn leaving the raw batch scored and segmented as shown in Fig. 1. The inherent adhesion between the particles tends to retain fairly sharply defined contours and the depth of the marking. The dicing device may be inserted the full depth of the batch to completely segment each section or may be inserted and withdrawn for only a portion of the depth of the batch. The mold top section is then assembled on the bottom section and the assembled mold is placed in the heating furnace.

Figure 4:
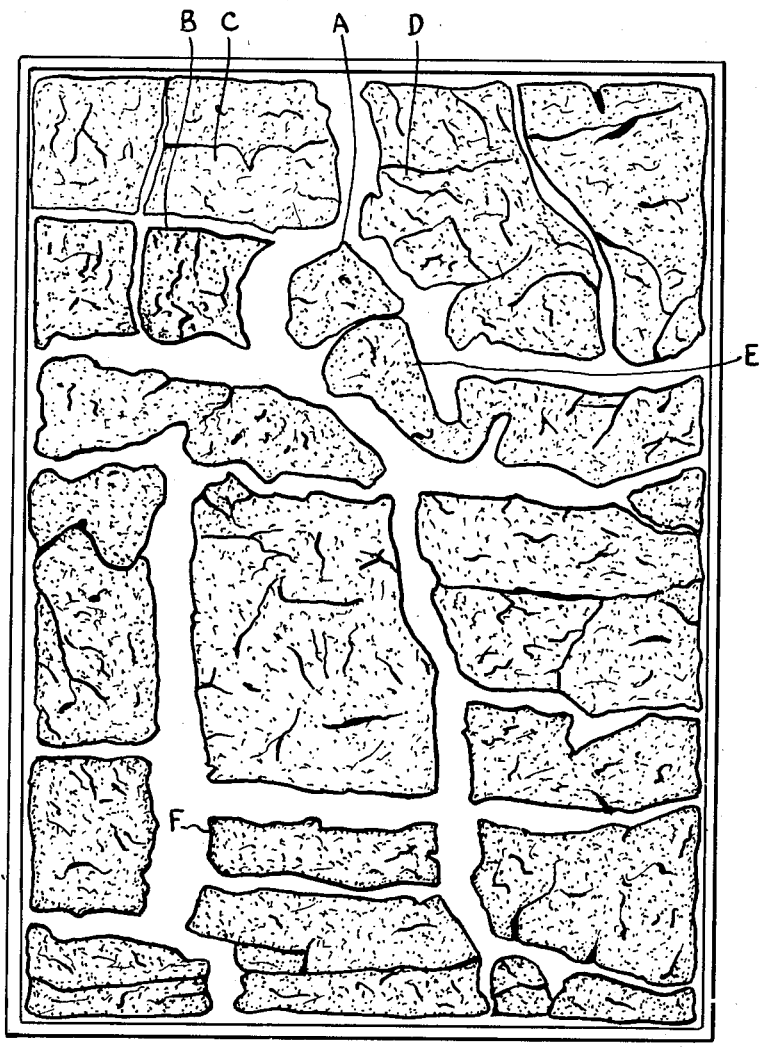
Fig. 4 is a plan view of a bottom half of a mold containing sintered raw batch illustrating typical shrinkage cracks when the raw batch is not diced as in Fig. 1 before sintering.

The batch and mold are heated to a temperature of about 1200° F. to 1350° F., depending upon the raw batch ingredients used, and the pulverulent batch sinters and contracts. If the pulverulent batch material is not originally segmented as described above the mass contracts and usually separates into irregularly shaped and spaced pieces as shown in Fig. 4 of the drawings. However, when the pulverulent batch material is segmented as above described the mass contracts during sintering into the regularly shaped segments in the molds such as shown in Fig. 5 of the drawings.

When the pieces of sintered material are both irregular in size and spacing, as in Fig. 4, folds, voids and nonuniform cell structure usually result. Referring to Fig. 4, sintered piece A is spaced from and considerably smaller than sintered pieces B, C and D. Piece A therefore normally attains cellulating temperature throughout the piece before either of pieces B, C or D. The lateral spreading of piece A tends to close the gap between pieces B, C and D before substantial cellulation takes place in the latter pieces. Thus during the initial cellulating period, the cells of piece A are materially larger than those of B, C and D. The greatly expanded cells of A in contact with the substantially noncellulated pieces B, C and D are crushed or pushed upwardly as B, C and D start to cellulate.

This action is now believed to be the cause of irregular cell structure in the finished product and the beginning of voids and folds. Similar actions are to be expected about pieces E and F. In the case of piece E, the irregular shape thereof causes wide variations in the rate at which the several portions of the piece reach the cellulating temperature.

Figure 5:
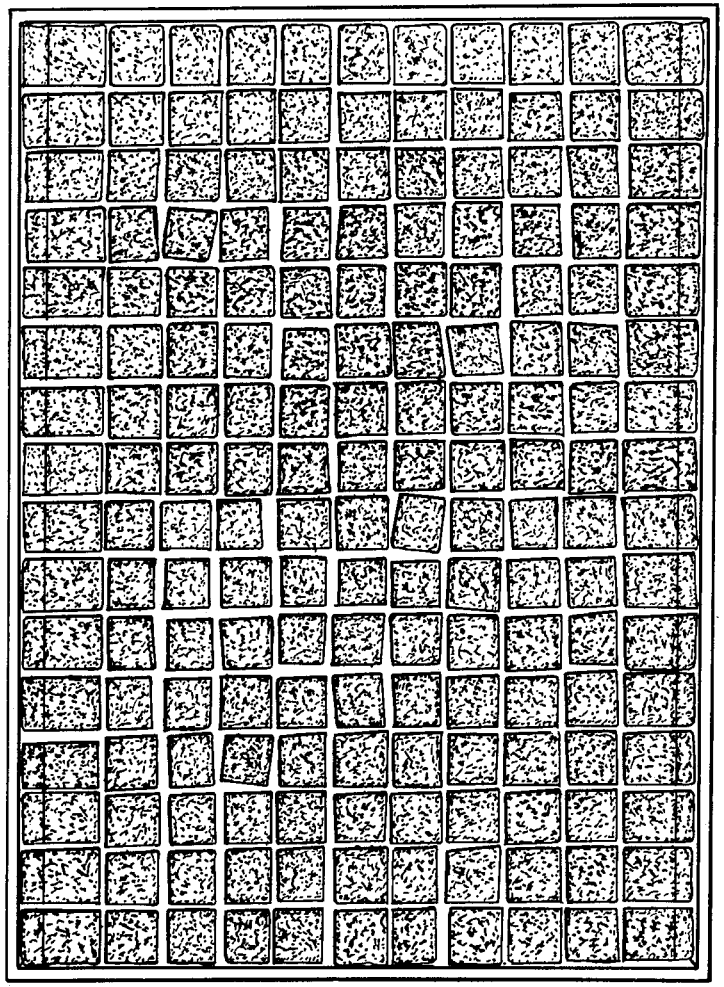
Fig. 5 shows in plan view a bottom half of a mold illustrating the controlled shrinkage and cracking of a diced raw batch as shown in Fig. 1 during sintering.

When the pieces of sintered material are regular in size and spacing as shown in Fig. 5, uniformity of heating of the pieces is more readily obtained. Since each piece is relatively small in size, it will heat to cellulating temperature more rapidly and uniformly, thus promoting uniformity of cell size within each piece and in relation to each of the other pieces.

Figs. 6 to 11 inclusive illustrate what happens to the sintered pieces as the temperature of the mold and contents thereof is raised to about 1400° F. to 1550° F. during their passage through the furnace. As the sintered batch material is raised to this temperature, the cellulating agents begin to react with the oxides and/or sulphates present in the glass, or present as additives to the batch, to form the cellulating gases which expand the sintered material into a single cellulated mass which fills the mold.

Figure 6:
Figs. 6, 7 and 8 illustrate initial cellulating action when the sintering action is controlled according to the present invention.
Figure 7:
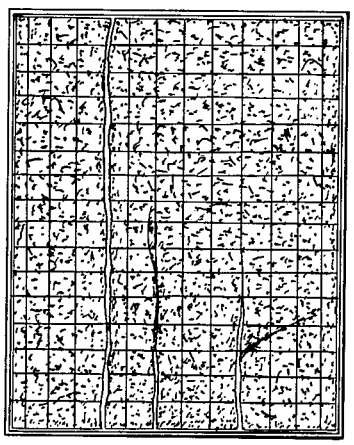
Figure 8:
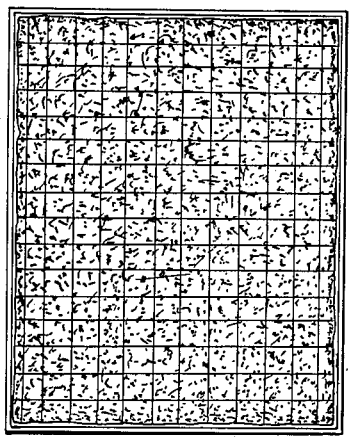

Figs. 6 to 8 inclusive illustrate the sequence of changes in the material which has been scored and sintered as shown in Figs. 1 and 5 respectively. As the sintered pieces approach cellulating temperature they expand and successively assume the appearance of Figs. 6, 7 and 8 in that order. In Fig. 8 the individual partially cellulated pieces have joined into one mass which is substantially uniform throughout in temperature and the former division lines are visible only as very shallow indentations upon the surface. The mass is still less than one-half the volume of the entire mold and continued expansion is substantially uniform until the entire mold is filled.

Figure 9:
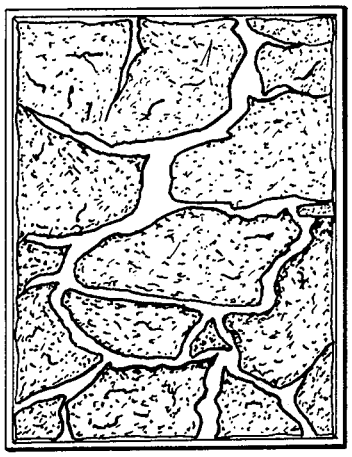
Figs. 9, 10 and 11 illustrate successively initial cellulating actions when sintering is not controlled in accordance with the present invention.
Figure 10:
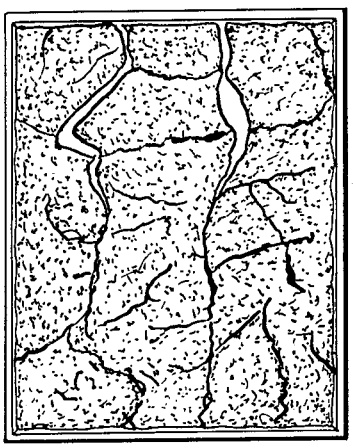
Figure 11:
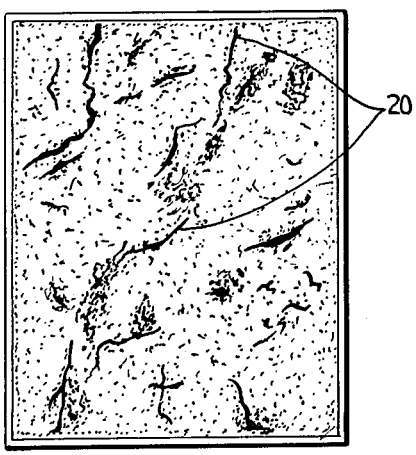

The sequence in changes of structure of the sintered material as shown in Fig. 4 is illustrated in Figs. 9 to 11 inclusive. As the cellulation proceeds, it can be noticed in Fig. 10 that some of the individual pieces have joined together, whereas others have not. In Fig. 11, where all of the segments have joined together, the irregular cellulating is manifested by the appearance of folds 20 upon the surface of the material.

It is to be understood that in Figs. 4 to 11 of the drawings only the bottom half of the mold is illustrated. The conditions shown therein were observed by interrupting the process during successive stages and removing the unfilled top half of the mold to observe the conditions illustrated.

The invention may be further illustrated by reference to the cellulation of a pulverulent material such as silica. Due to the nature of the material involved, much higher temperatures are required for the cellulation of silica. This makes the problem of uniform heating for sintering and cellulating much greater. It has been found that when a large amount of the pulverulent batch comprised of silica and a carbonaceous cellulating agent was attempted to be cellulated without scoring or segmenting of the batch, a considerably longer sintering period was necessary to obtain a uniformly cellulated material.

It was also observed that large voids and folds appeared in the cellulated silica when it was sintered and cellulated without being previously segmented. Silica is a viscous material at sintering and cellulating temperatures and it cellulates and expands laterally much more readily than vertically. As a consequence, the cellulating silica batch expands laterally until it meets the side of the mold or furnace in which it is contained and then tends to buckle. The whole cellulating mass rises in the middle with the bottom surface of the central portions of the mass moving upwardly and away from the supporting mold, platen, or other supporting surface in the furnace. Such activity of the cellulating batch is known as folding.

In accordance with the present invention it was found that when small individual segments of batch were formed, placed a small distance apart on a graphite slab and heated, a shorter sintering time was required and uniform cellulation was obtained free from folds. It has also been found desirable to have the segments as compact as possible. For example, 112 compactly formed segments, one and a half inch square by five eighths inch thick were placed on end on a 13 x 18 inch graphite slab. The segments were arranged in eight rows of 14 each with about ¼ to ⅜ inch spacing between them. The slab and contents were then inserted in a carbon electric furnace and in 27 minutes brought up evenly to a temperature of about 3360° F., maintained at such temperature for about 9 minutes, and then allowed to cool to room temperature. A single slab of uniformly cellulated silica 4 x 13 x 18 inches in size having a density of about twelve pounds per cubic foot was formed from such treatment.

Although the present invention has been described with particular reference to the cellulation of glass and silica, it is to be understood that it is applicable to the cellulation of other pulverulent vitreous materials such as slag, glass batch materials, natural mineral silicates, etc. when they are combined with a suitable cellulating agent such as a carbonaceous material and heated to a temperature sufficient to cause them to sinter and cellulate. The invention is also intended to include the cellulation of pulverulent batches of vitreous material and cellulating agents to which have been added small amounts of metals, metal oxides and sulphates and other materials to aid in the cellulation thereof.

The invention has been described with respect to the cellulation of a pulverulent batch material when contained in a suitable mold, however, it is not to be considered as limited to such procedure. The batch material may be placed on a continuous conveyor, segmented by suitable means such as a rotating dicing device placed above the conveyor and the segmented batch transported through a heating zone, or other suitable procedures may be employed to segment, sinter and cellulate the vitreous product without departing from the purview of the invention.

This application is a continuation-in-part of our co-pending application Serial No. 190,069, filed October 14, 1950, for Process of Manufacturing Cellular Glass, now abandoned.

We claim:

1. A method of preparing a vitreous cellulated material from a pulverulent batch comprising the vitreous material and a cellulating agent which comprises forming the batch into small segments and heating the segments to a temperature sufficient to cause the segments to sinter and cellulate and expand by entrapment of gases formed therein and become consolidated into a unitary structure.

2. A method of preparing cellular silica from a pulverulent batch comprising silica and a cellulating agent which comprises forming the batch into small segments and heating the segments to a temperature sufficient to cause the segments to sinter and cellulate and expand by entrapment of gases formed therein and become consolidated into a unitary structure.

3. In a process of manufacturing cellular glass from pulverulent raw batch materials heated within closed molds including the steps of sintering the raw batch and then cellulating the sintered batch; the steps of loading a suitable volume of raw batch into a mold, distributing the raw batch evenly upon the bottom of the mold and then dividing the raw batch into a plurality of substantially equal portions by imprinting division lines therein.

4. In a process of manufacturing cellular glass from pulverulent raw batch materials heated within closed molds including the steps of sintering the raw batch and then cellulating the sintered batch; the step of controlling sintering and the initial stages of cellulation of the sintered batch by preliminary scoring of the surface of the raw batch after loading the mold and before closing the mold for heating the contents.

5. A method of preparing a vitreous cellulated body, which comprises providing a pulverulent batch comprising vitreous material and a cellulating agent, dividing the batch into small segments spaced substantially uniformly from each other, and heating the substantially uniformly spaced segments to a temperature sufficient to cause the segments to sinter and expand by entrapment of gases formed therein and become consolidated into a unitary body.

6. A method of preparing a vitreous cellulated body, which comprises providing a pulverulent batch comprising vitreous material and a cellulating agent, dividing the batch into small segments arranged in a substantially level layer, and heating said layer to a temperature sufficient to cause the segments to sinter and expand by entrapment of gases formed therein and become consolidated into a unitary body.

7. A method of preparing a vitreous cellulated body, which comprises providing a pulverulent batch comprising vitreous material and a cellulating agent, forming the batch into a layer, dividing the top surface and at least a part of the thickness of said layer into small segments, and heating said layer to a temperature sufficient to cause the segments to sinter and expand by entrapment of gases formed therein and become consolidated into a unitary body.

8. In a process of manufacturing a vitreous cellulated material wherein a pulverulent batch comprising a vitreous material and a cellulating agent is heated to a temperature sufficient to sinter and cellulate the batch, the improvement which comprises imprinting lines of separation upon the batch prior to sintering and cellulating it.

References Cited in the file of this patent

UNITED STATES PATENTS

| | | |
|---|---|---|
| 1,118,441 | Porter | Nov. 24, 1914 |
| 1,543,770 | Hilbert | June 30, 1925 |
| 2,123,536 | Long | July 12, 1938 |
| 2,578,110 | Tooley | Dec. 11, 1951 |